Patented Dec. 19, 1944

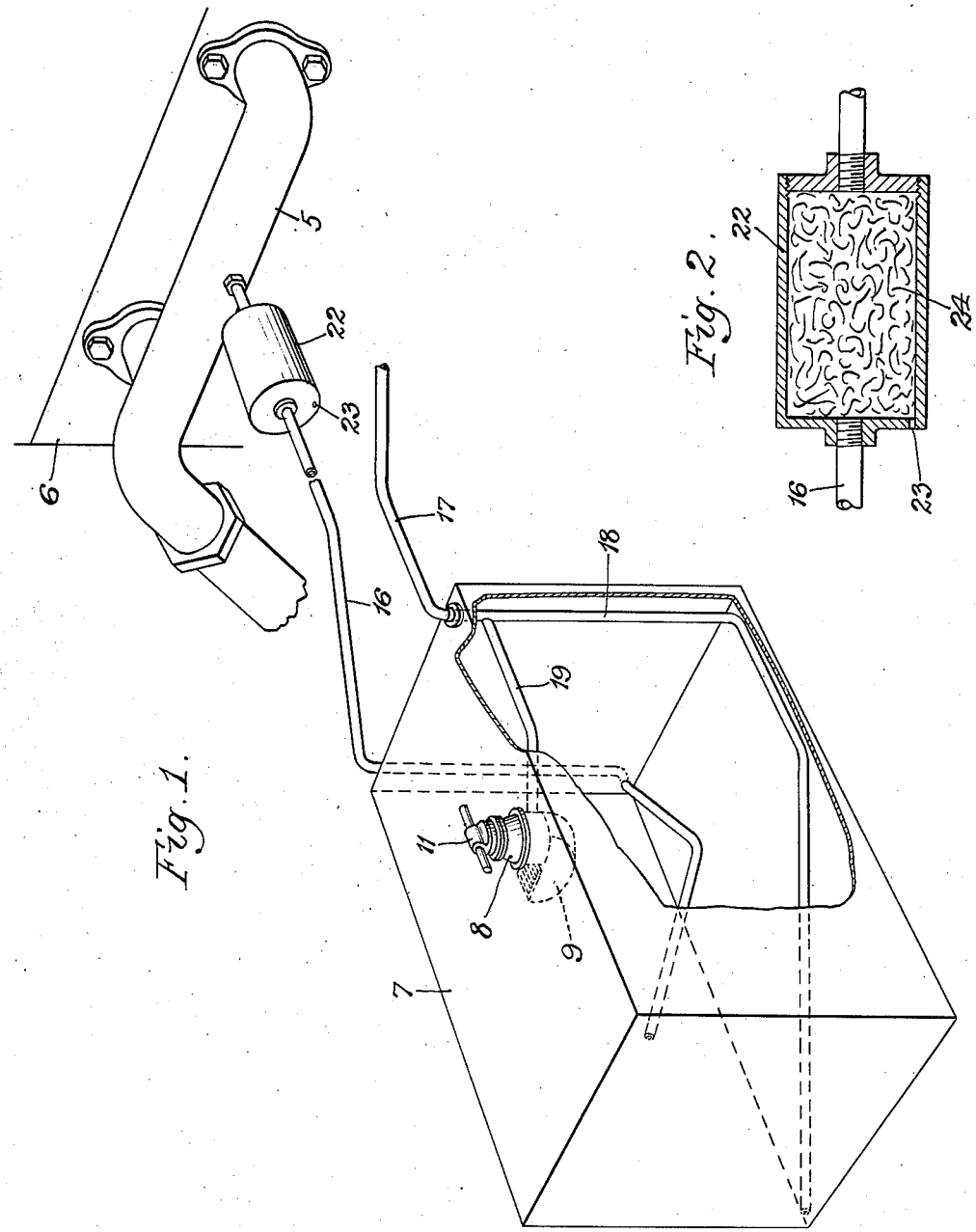

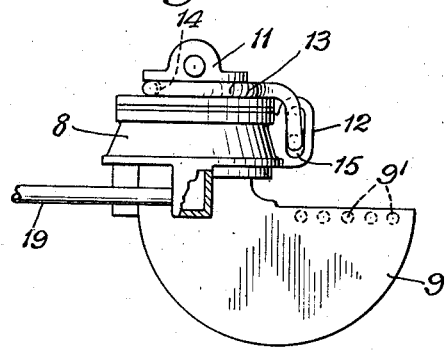
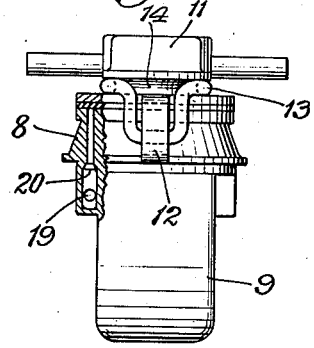
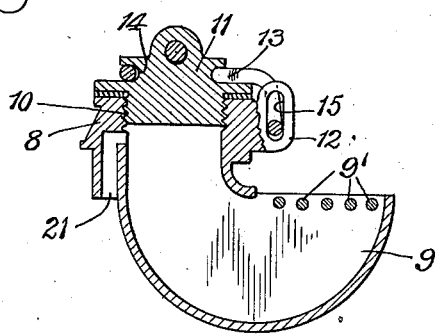
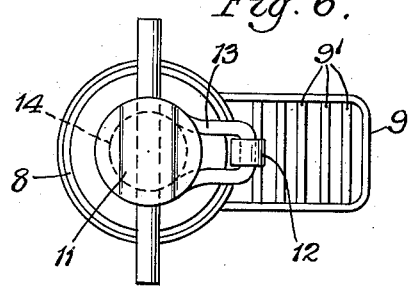
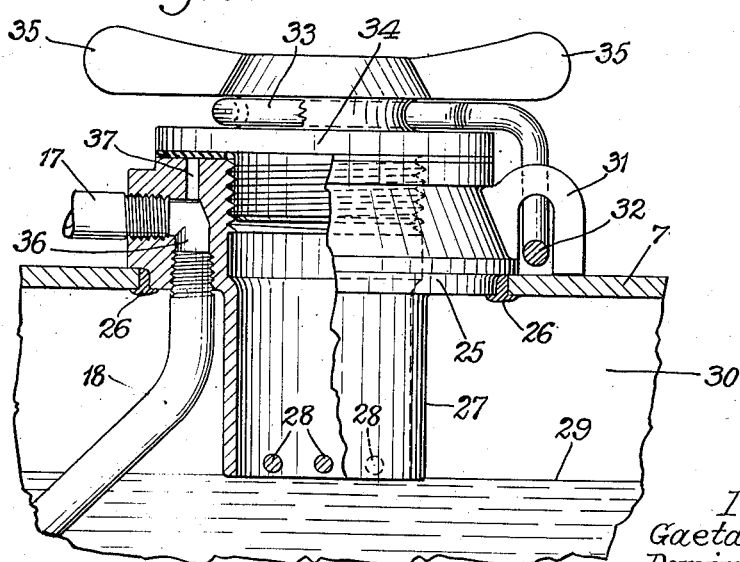

2,365,624

UNITED STATES PATENT OFFICE 2,365,624

SAFETY FUEL TANK

Dominic Cantello and Gaetano Cantello, Streator, Ill.

Application January 21, 1941, Serial No. 375,284

14 Claims. (Cl. 158—36)

This invention relates to fuel tanks and, more particularly, to such tanks as are used in connection with internal combustion engines, automotive or stationary.

An object of the present invention is to provide a fuel tank so equipped as to effectively guard against explosions.

In accordance with the present invention means is provided whereby, as a safety measure, such a tank is supplied with non-combustible gases from the exhaust manifold of the combustion engine to fill the space from which the fuel has been withdrawn as the fuel is consumed by the engine or other prime mover.

Other objects will appear from time to time throughout the specification and the claims.

The invention is more or less diagrammatically illustrated in the accompanying drawings, wherein:

Figure 1 is a perspective of one form of the invention with parts broken away and parts in section;

Figure 2 is a sectional view of a combination filter and spark and flame arrester;

Figure 3 is an elevation of one form of a cap and filler spout for the tank;

Figure 4 is an elevation of the assembly shown in Figure 3 and taken at right angles to Figure 3, with parts broken away and parts in section;

Figure 5 is a vertical sectional view through the cap and filler spout;

Figure 6 is a top plan view of the cap and filler spout; and

Figure 7 is a sectional view of a modified form of filler cap assembly.

Like parts are designated by like characters throughout the specification and the drawings.

5 indicates the exhaust manifold of an internal combustion engine, a portion of which is shown in the drawings and indicated generally by the reference numeral 6.

The fuel tank 7 is preferably constructed without any air vents.

The tank 7 has mounted in the top wall thereof the neck 8, which may be formed integrally with a curved or substantially semi-circular filling spout 9 that opens through the top thereof at one side of the neck 8 for the passage of fuel from the spout 9 into the tank 7.

Spaced bars 9' may extend across the outlet of the spout 9 to prevent a fuel filling or removing nozzle from being passed through the spout 9 into the tank 7 during the time of filling said tank with fuel. They, also, prevent unauthorized removal of fuel.

The neck 8 has a threaded bore 10 for screwthreadedly receiving a closure plug or cap 11.

A combination retainer and hinge assembly is provided for the cap 11 including a hinge lug 12, mounted on the neck 8, a loop member 13 which has an end portion embracing the cap 11 and seating within a groove 14 provided in the cap. The loop has a second end portion bent at right angles to the cap-embracing portion which passes through a slot 15 provided therefor in the lug 12.

Thus, the cap 14 is free for rotation to thread the cap into the neck 8 and also to permit ready removal of the cap. When the cap has been removed from the neck 8, the cap and loop 13 may be swung laterally on the hinge connection formed by the loop 13 and the lug 12 to an out-of-the-way position.

A tube 16 extends from the exhaust manifold 5 of the engine to the tank 7, passing into the tank 7 through an opening provided therefor, preferably in an end wall of the tank and adjacent to the bottom of the tank. It then passes inwardly and preferably upwardly towards the opposite end of the tank.

The end of a fuel supply line 17 has an end within the tank 7 and it may lie substantially diagonal to the bottom of the tank and adjacent to said bottom, with a portion of the conduit 17 being disposed vertically at 18 where it passes through an opening provided therefor in the top of the tank 7. From the tank 7 the supply line 17 leads to the fuel pump or other means (not shown) for carrying or forcing fuel to the combustion engine.

An airlock line 19 connects an airlock orifice 20 formed in a formation on the wall of the neck 8 with the fuel line riser 18, and thus, upon loosening or the removal of the cap or plug 11, air from the atmosphere will pass through the orifice 20 and the line 19 to the riser 18, thereby preventing the flow of fuel to the engine.

For venting the fuel tank during refueling operations, the neck is provided with a vent opening 21, provided in the wall thereof and opening at one end into the tank 7 and at its opposite end into the neck 8, as shown in Figure 5.

From the above it will also be apparent that when the engine is in operation exhaust gases will pass from the exhaust manifold 5 through the conduit 16 into the tank 7 to fill the space emptied by the fuel which has been withdrawn from the tank in supplying the engine.

Interposed in the exhaust gas line 16 is a cartridge 22, shown in section in Figure 2 and having a drain opening 23, and arranged in the cartridge 22 is a filler 24 of any material suitable for use as a filter to remove foreign matter from the exhaust gases, and as a spark and flame arrester.

If desired, the cartridge 22 may be charged with any suitable chemical or other material for the removal of undesirable gases from the combustion engine.

Due to the arrangement and location of the ends of the conduits 16 and 17, respectively, within the tank 7, there will be no escape of fuel from the tank should the tank be up-ended in either way, and/or should either one or both of the conduits 16, 17, respectively, become broken.

In the modified form of Figure 7, there is shown a filler member which differs somewhat from that shown in the earlier figures. As there shown, the filler comprises a housing member 25 secured by welding 26 or otherwise in a wall of the tank 7. The filler connection 25 includes an inwardly projecting member 27 which may have bars 28 across its inner end. In one suitable installation, the filler connection is mounted in the top of the tank and the downwardly depending member 27 prevents complete filling of the tank. The fuel line in the tank at maximum filling condition stands approximately at the level 29, and there is a void or nonfillable space 30 above it and between it and the top of the tank. The filler member 25 may include a lug 31 within which a portion 32 of a cap retainer loop 33 is mounted. The cap 34 is shaped to receive the loop 33 and is provided with wings 35 by means of which it may be rotated. The assembly permits rotation of the cap and, when the latter is free from the filler housing, it permits it to be swung backwardly away from it. A passage 36 is formed in the filler housing. The fuel line riser 18 preferably is engaged in the inner opening of that passage. The conduit portion 17 leading to the engine or fuel pump is connected to the outer or upper end of the passage 36. An airlock passage 37 communicates with the passage 36 and at its outer end with the upper or outer face of the filler housing 25. This airlock passage has the same use as the airlock passage 20 shown in Figure 4. When the cap is open or not tightly positioned, to close this opening air will enter through it and will be drawn to the engine or fuel pump and will stop the engine because of its failure to get fuel or because of its failure to get sufficient fuel.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention are as follows:

The device is assembled in connection with an internal combustion engine. The tank, of course, comprises the source of fuel for the engine. Under normal operating conditions fuel is withdrawn through the pipe 17 and passes to the carburetor or direct to the engine, as the case may be.

As fuel is withdrawn from the tank the free space within the tank is increased, and if air were present in this space a combustible mixture of air and fuel or fuel vapor might be formed. To prevent this, the pipe 16 conducts inert gas into the tank. This gas is passed through the chamber 22 and whatever material may be in it. The gas is also dehydrated and the material 24 prevents any sparks or flames from reaching the tank. Only a limited quantity of inert gas can enter the tank because pressure conditions within the tank prevent a large quantity from entering. When the tank is first full little or no gas will enter. Since the tank is closed to the air and since the pressure in the exhaust manifold is relatively low, gas is not forced into the tank and only sufficient gas can enter the tank to take up the space gradually vacated by the fuel as it is withdrawn.

The provision of the air passage 20 automatically notifies the operator of any leak. If the cap is open or not tightly closed, air might enter the tank and defeat the safety purposes of the invention. Therefore, it is important to make sure that the operator always knows when the tank is open. The provision of the air passage 20 accomplishes this. If the cap is not closed, air is drawn from the tank through the bypass pipe 19 and into the pipe 17 and to the carburetor or to the engine. When this condition occurs, fuel is not drawn at all or at least is not drawn in sufficient quantities through the pipe 18, and the engine receiving no fuel or insufficient fuel comes to a stop. The invention thus provides an automatic means for notifying the operator when the filler cap is loose or when there is any other leak, and thus notifies the operator that conditions which would prevent the safe operation of the device have developed, and he can then do whatever is necessary to restore safe conditions.

We claim:

1. In combination, for use with an internal combustion engine, a fuel tank, said tank comprising means for retaining inert gas, fuel conduit means from said tank for attachment to an engine, means for supplying inert gas to said tank, said means comprising a conduit for connecting the exhaust of an engine to said tank, filter means in said conduit adapted to dehydrate gases moving toward the tank, and a filler connection in said tank having a removable top, a filler opening and an airlock opening, said top, when in the closed position, closing both of said openings, and a connection from said airlock opening to said fuel conduit.

2. In combination, for use with an internal combustion engine, a fuel tank, fuel conduit means from said tank for attachment to an engine, means for supplying inert gas to said tank, said tank being without gas outlet, said means comprising a conduit for connecting the exhaust of an engine to said tank, filter means in said conduit adapted to dehydrate gases moving toward the tank, said filter means including a filter housing, an opening therein adjacent its bottom and filter material within said housing, and an inlet and an outlet connection in said housing for the said conduit leading from said exhaust to said tank, and a filler connection in said tank having a removable top, a filler opening and an airlock opening, said top, when in the closed position, closing both of said openings, and a connection from said airlock opening to said fuel conduit.

3. In combination, for use with an internal combustion engine, a fuel tank, adapted to retain inert gas, fuel conduit means for connecting said tank to an engine, means for supplying inert gas to said tank, said means comprising a conduit for connecting the exhaust of an engine to said tank, filter means in said conduit adapted to remove solid matter and to dehydrate gases moving toward the tank and to prevent overheated gases from reaching the tank, and a filler connection in said tank having a removable top, a filler opening and an airlock opening, said top, when in the closed position, closing both of said openings, and a connection from said airlock opening to said fuel conduit.

4. In combination, for use with an internal combustion engine, a fuel tank, fuel conduit means for connecting said tank to an engine, means for supplying inert gas to said tank, said means comprising a conduit for connecting the exhaust of an engine to said tank, filter means in said conduit adapted to remove solid matter and to dehydrate gases moving toward the tank and to prevent overheated gases from reaching the tank, said filter means including a filter housing, an opening therein adjacent its bottom and filter material within said housing, and an inlet and an outlet connection in said housing for the said conduit leading to said tank, and a filler connection in said tank having a removable top, a filler opening and an airlock opening, said top, when in the closed position, closing both of said openings, and a connection from said airlock opening to said fuel conduit.

5. In combination, for use with an internal combustion engine, a fuel tank, fuel conduit means for connecting said tank to an engine, means for supplying inert gas to said tank as fuel is withdrawn therefrom and for retaining said gas therein, said means comprising a conduit for connecting the exhaust of an engine to said tank, filter means in said conduit adapted to dehydrate gases moving toward the tank, and a filler connection in said tank having a removable top, a filler opening and an airlock opening, said top, when in the closed position, closing both of said openings, and a connection from said airlock opening to said fuel conduit.

6. In combination, for use with an internal combustion engine, a fuel tank, fuel conduit means for connecting said tank to an engine, means for supplying inert gas to said tank and for retaining said gas therein, said means comprising a conduit for connecting the exhaust of an engine to said tank, said conduit entering the tank adjacent its bottom and, within the tank being directed upwardly to a point adjacent the top of the tank, filter means in said conduit adapted to dehydrate gases moving toward the tank, and a filler connection in said tank having a removable top, a filler opening and an airlock opening, said top, when in the closed position, closing both of said openings, and a connection from said airlcok opening to said fuel conduit.

7. In combination, for use with an internal combustion engine, a fuel tank, fuel conduit means for connecting said tank to an engine, means for supplying inert gas to said tank as fuel is withdrawn therefrom and for retaining said gas therein, said means comprising a conduit for connecting the exhaust of an engine to said tank, said conduit entering the tank adjacent its bottom and, within the tank being directed upwardly to a point adjacent the top of the tank, filter means in said conduit adapted to dehydrate gases moving toward the tank, and a filler connection in said tank having a removable top, a filler opening and an airlock opening, said top, when in the closed position, closing both of said openings, and a connection from said airlock opening to said fuel conduit.

8. In combination, for use with an internal combustion engine, a fuel tank, fuel conduit means for connecting said tank to an engine, means for supplying inert gas to said tank as fuel is withdrawn therefrom, said means comprising a conduit for connecting the exhaust of said engine to said tank, said conduit entering the tank adjacent its bottom and within the tank, being directed upwardly to a point adjacent the top of the tank, filter means in said conduit adapted to remove solid matter and to dehydrate gases moving toward the tank and to prevent overheated gases from reaching the tank, and a filler connection in said tank having a removable top, a filler opening and an airlock opening, said top, when in the closed position, closing both of said openings, and a connection from said airlock opening to said fuel conduit.

9. In combination, for use with an internal combustion engine, a fuel tank, fuel conduit means for connecting said tank to an engine, means for supplying inert gas to said tank as fuel is withdrawn therefrom, said means comprising a conduit for connecting the exhaust of an engine to said tank, said conduit entering the tank adjacent its bottom, and within the tank being directed upwardly to a point adjacent the top of the tank, filter means in said conduit adapted to remove solid matter and to dehydrate gases moving toward the tank and to prevent overheated gases from reaching the tank, said filter means including a filter housing, an opening therein adjacent its bottom and filter material within said housing, and an inlet and an outlet connection in said housing for the said conduit leading to said tank, and a filter connection in said tank having a removable top, a filler opening and an airlock opening, said top, when in the closed position, closing both of said openings, and a connection from said airlock opening to said fuel conduit.

10. In combination, for use with the exhaust manifold of an internal combustion engine, a fuel supply tank having a filling neck extending through a wall thereof and a filling spout integral with said neck internally of said tank, said neck having a wall portion formed with an airlock orifice opening to the atmosphere at the outer end of the neck, a closure plug for said neck closing said end of said orifice when in position on said neck, a fuel conduit for conducting fuel from the tank to a point of use of an internal combustion engine, said fuel conduit having a vertical portion disposed in said tank, and a conduit connection between said airlock orifice and the vertical portion of said fuel conduit for the passage of air from the atmosphere through said orifice, said conduit connection and said fuel conduit upon loosening or removal of said cap.

11. In combination, for use with the exhaust manifold of an internal combustion engine, a fuel supply tank having a filling neck extending through a wall thereof and a filling spout integral with said neck internally of said tank, said neck having a wall portion formed with an airlock orifice opening to the atmosphere at the outer end of the neck, a closure plug for said neck closing said end of said orifice when in position on said neck, a fuel conduit for conducting fuel from the tank to a point of use of an internal combustion engine, said fuel conduit having a vertical portion disposed in said tank, and a conduit connection between said airlock orifice and the vertical portion of said fuel conduit for the passage of air from the atmosphere through said orifice, said conduit connection and said fuel conduit upon loosening or removal of said cap, said cap and said filling neck being complementarily threaded for screw-threaded engagement of the cap with said neck, and a hinge connection between said neck and said cap embodying a fixed hinge member on said neck, and a second hinge member freely movable relative to the first hinge member and with which said cap is swivelly connected.

12. In combination, for use with the exhaust manifold of an internal combustion engine, a fuel supply tank having a filling neck extending through a wall thereof and a filling spout integral with said neck internally of said tank, said neck having a wall portion formed with an airlock orifice opening to the atmosphere at the outer end of the neck, a closure plug for said neck closing said end of said orifice when in position on said neck, a fuel conduit for conducting fuel from the tank to a point of use of an internal combustion engine, said fuel conduit having a vertical portion disposed in said tank, and a conduit connection between said airlock orifice and the vertical portion of said fuel conduit for the passage of air from the atmosphere through said orifice, said conduit connection and said fuel conduit upon loosening or removal of said cap, an exhaust gas conduit suitable for connecting to an internal combustion engine extending into said tank, and a combination filter and spark and flame arrester interposed in said exhaust gas conduit.

13. In combination, for use with the exhaust manifold of an internal combustion engine, a fuel supply tank having a filling neck extending through a wall thereof and a filling spout integral with said neck internally of said tank, said neck having a wall portion formed with an airlock orifice opening to the atmosphere at the outer end of the neck, a closure plug for said neck closing said end of said orifice when in position on said neck, a fuel conduit for conducting fuel from the tank to a point of use of an internal combustion engine, said fuel conduit having a vertical portion disposed in said tank, and a conduit connection between said airlock orifice and the vertical portion of said fuel conduit for the passage of air from the atmosphere through said orifice, said conduit connection and said fuel conduit upon loosening or removal of said cap, said cap and said filling neck being complementarily threaded for screw-threaded engagement of the cap with said neck, and a hinge connection between said neck and said cap embodying a fixed hinge member on said neck, and a second hinge member freely movable relative to the first hinge member and with which said cap is swivelly connected, and means for supplying exhaust gases from an internal combustion engine to said tank as and for the purpose specified.

14. In combination, for use with the exhaust manifold of an internal combustion engine, a fuel supply tank having a filling neck extending through a wall thereof and a filling spout integral with said neck internally of said tank, said neck having a wall portion formed with an airlock orifice opening to the atmosphere at the outer end of the neck, a closure plug for said neck closing said end of said orifice when in position on said neck, a fuel conduit for conducting fuel from the tank to a point of use of an internal combustion engine, said fuel conduit having a vertical portion disposed in said tank, and a conduit connection between said airlock orifice and the vertical portion of said fuel conduit for the passage of air from the atmosphere through said orifice, said conduit connection and said fuel conduit upon loosening or removal of said cap, said cap and said filling neck being complementarily threaded for screw-threaded engagement of the cap with said neck, and a hinge connection between said neck and said cap embodying a fixed hinge member on said neck, and a second hinge member freely movable relative to the first hinge member and with which said cap is swivelly connected, and means suitable for supplying exhaust gases from an exhaust manifold of the engine to said tank, and a combination filter and spark and flame arrester interposed between the exhaust manifold and said tank and through which the exhaust gases are constrained to pass in passage from an exhaust manifold to said tank.

DOMINIC CANTELLO.
GAETANO CANTELLO.